(12) United States Patent
Büttner et al.

(10) Patent No.: US 9,281,728 B2
(45) Date of Patent: Mar. 8, 2016

(54) ELECTRIC MACHINE HAVING EFFICIENT INTERNAL COOLING

(71) Applicant: Siemens Aktiengesellschaft, München (DE)

(72) Inventors: Klaus Büttner, Hollstadt (DE); Klaus Kirchner, Ostheim (DE); Michael Müller, Bad Kissingen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 483 days.

(21) Appl. No.: 13/851,476

(22) Filed: Mar. 27, 2013

(65) Prior Publication Data

US 2013/0257197 A1  Oct. 3, 2013

(30) Foreign Application Priority Data

Mar. 28, 2012 (EP) .................................. 12161812

(51) Int. Cl.
*H02K 9/08* (2006.01)
*H02K 9/19* (2006.01)
(Continued)

(52) U.S. Cl.
CPC . *H02K 9/19* (2013.01); *B60L 1/003* (2013.01); *B60L 3/0061* (2013.01); *B60L 7/12* (2013.01); *B60L 7/14* (2013.01); *B60L 11/1803* (2013.01); *B60L 11/1805* (2013.01); *H02K 1/20* (2013.01); *H02K 1/325* (2013.01); *H02K 9/08* (2013.01); *B60L 2220/12* (2013.01); *B60L 2220/14* (2013.01); *B60L 2220/16* (2013.01); *B60L 2220/50* (2013.01); *B60L 2240/34* (2013.01); *B60L 2240/36* (2013.01)

(58) Field of Classification Search
CPC ........... H02K 1/20; H02K 1/325; H02K 9/08; H02K 9/19
USPC .......................... 310/54, 57, 58, 59, 60 A, 64
IPC ................................................. H02K 9/08, 9/19
See application file for complete search history.

(56) References Cited

U.S. PATENT DOCUMENTS 3,801,843 A * 4/1974 Corman .............. F28D 15/0275
165/104.25
6,304,011 B1 * 10/2001 Pullen ...................... H02K 1/20
310/52
(Continued)

FOREIGN PATENT DOCUMENTS

DE    18 02 282 U    12/1959
DE    18 13 190 U    6/1960
(Continued)

*Primary Examiner* — John K Kim
(74) *Attorney, Agent, or Firm* — Henry M. Feiereisen LLC.

(57) ABSTRACT

An electric machine includes a stator device having axial first cooling channels, and second and third cooling channels. The third cooling channels are arranged in the first cooling channels and extend at least substantially along an entire axial length thereof. The stator device is configured for inflow and outflow of a liquid cooling medium at least partially through the second cooling channels and for the liquid cooling medium to be conducted through the third cooling channels. A rotor is arranged on a rotor shaft for rotation around a rotational axis. Limiting elements are mounted on the stator device axially on both sides to thereby bound an internal rotor space which is in communication with axial ends of the first cooling channels of the stator device to thereby establish an internal air-cooling circuit from the internal rotor space through the first cooling channels and back into the internal rotor space.

17 Claims, 5 Drawing Sheets

(51) Int. Cl.

| | | |
|---|---|---|
| *B60L 1/00* | (2006.01) | |
| *B60L 3/00* | (2006.01) | |
| *B60L 7/12* | (2006.01) | |
| *B60L 7/14* | (2006.01) | |
| *B60L 11/18* | (2006.01) | |
| *H02K 1/20* | (2006.01) | |
| *H02K 1/32* | (2006.01) | |

(56) References Cited

U.S. PATENT DOCUMENTS

| | | | | |
|---|---|---|---|---|
| 7,411,323 B2 * | 8/2008 | Pfannschmidt | ......... | H02K 1/20 310/58 |
| 7,808,136 B2 * | 10/2010 | Knauff | ............ | H02K 1/20 310/215 |
| 8,072,100 B2 * | 12/2011 | Monzel | ............ | H02K 1/20 310/216.119 |
| 8,519,580 B2 * | 8/2013 | Brandl | ............ | H02K 9/16 310/57 |
| 2011/0140550 A1 * | 6/2011 | Brandl | ............ | H02K 9/16 310/57 |
| 2013/0257197 A1 * | 10/2013 | Buttner | ............ | H02K 9/08 310/54 |

FOREIGN PATENT DOCUMENTS

| | | |
|---|---|---|
| DE | 11 16 797 B | 11/1961 |
| DE | 199 05 539 A1 | 8/2000 |
| DE | 10 2008 036 124 A1 | 2/2010 |

* cited by examiner

ELECTRIC MACHINE HAVING EFFICIENT INTERNAL COOLING

CROSS-REFERENCES TO RELATED APPLICATIONS

This application claims the priority of European Patent Application, Serial No. 12161812, filed Mar. 28, 2012, pursuant to 35 U.S.C. 119(a)-(d), the content of which is incorporated herein by reference in its entirety as if fully set forth herein.

BACKGROUND OF THE INVENTION

The present invention relates to an electric machine, and in particular to a cooling system for such an electric machine.

The following discussion of related art is provided to assist the reader in understanding the advantages of the invention, and is not to be construed as an admission that this related art is prior art to this invention.

Losses occur in electric machines while they are operating that result in heat generation. Heat is generated partially in the stator device and partially in the rotor of the electric machine and has to be ducted away from the electric machine. Cooling the stator device can be realized using air or alternatively a liquid cooling medium, for example water. When electric machines of relatively low protection class is involved, removal of heat from the internal rotor space can be realized fairly easily. In the case of electric machines that are enclosed in accordance with a relatively high protection class—IP 55 or better—the internal rotor space cannot be cooled directly by using outside ambient air. The presence of an internal cooling circuit is therefore provided in which air circulates between the internal rotor space and the stator device. The internal rotor space is cooled indirectly via the stator device.

It would be desirable and advantageous to provide an improved electric machine to obviate prior art shortcomings and to provide efficient cooling of the electric machine while exploiting generated thermal energy produced in particular in the internal rotor space.

SUMMARY OF THE INVENTION

According to one aspect of the present invention, an electric machine includes a stator device having axial first cooling channels, and second and third cooling channels, the third cooling channels arranged in the first cooling channels and extending at least substantially along an entire axial length of the first cooling channels, the stator device being configured for inflow and outflow of a liquid cooling medium at least partially through the second cooling channels and for the liquid cooling medium to be conducted through the third cooling channels, a rotor shaft, a rotor arranged in a rotationally fixed manner on the rotor shaft, a bearing assembly supporting the rotor shaft so that the rotor shaft and the rotor are rotatable around a rotational axis, and limiting elements mounted on the stator device axially on both sides so that the stator device and the limiting elements bound an internal rotor space radially externally and axially on both sides in communication with axial ends of the first cooling channels of the stator device to thereby establish an internal air-cooling circuit from the internal rotor space through the first cooling channels and back into the internal rotor space.

According to another advantageous feature of the present invention, the stator device can have partitions to separate the first and second cooling channels from one another, with the partitions having sides facing the first cooling channels and provided with cooling-fin-like primary projections.

According to another advantageous feature of the present invention, the primary projections can have sides facing the first cooling channels and provided with cooling-fin-like secondary projections. In this way, transfer of heat from the internal air-cooling circuit to the liquid cooling medium can be improved. Advantageously, the cooling-fin-like primary projections can be hollow inside for flow of liquid cooling medium there through. This also improves transfer of heat from the internal air-cooling circuit to the liquid cooling medium, in particular when the parts of the primary projections through which the liquid cooling medium flows are constituent parts of the second cooling channels.

According to another advantageous feature of the present invention, the second and third cooling channels for flow of liquid cooling medium can be separate from one another. The second and third cooling channels may hereby be advantageously be arranged in terms of the flow of the liquid cooling medium in parallel relationship to one another or in series with one another.

According to another advantageous feature of the present invention, the third cooling channels can be embodied as pipes arranged in the first cooling channels. Various configurations are possible. For example, the pipes arranged in the first cooling channels may have first and second pipe sections arranged behind one another as viewed in a direction of flow of the liquid cooling medium, with first pipe section extending axially, and with the second pipe section extending spirally around the first pipe section. As an alternative, the first and second pipe sections may extend in the form of a double helix around a channel axis in parallel relationship to the rotational axis. It is also possible for the pipes arranged in the first cooling channels to extend axially and for air-ducting elements to be arranged on the pipes so that the air of the internal air-cooling circuit circulates spirally around the pipes arranged in the first cooling channels.

Even though the electric machine can be embodied as a non-enclosed electric machine, the stator device typically has a stator and a housing, with the housing surrounding the stator radially externally.

According to another aspect of the present invention, a motor vehicle includes a main drive having an electric machine which includes a stator device having axial first cooling channels, and second and third cooling channels, the third cooling channels arranged in the first cooling channels and extending at least substantially along an entire axial length of the first cooling channels, the stator device being configured for inflow and outflow of a liquid cooling medium at least partially through the second cooling channels and for the liquid cooling medium to be conducted through the third cooling channels, a rotor shaft, a rotor arranged in a rotationally fixed manner on the rotor shaft, a bearing assembly supporting the rotor shaft so that the rotor shaft and the rotor are rotatable around a rotational axis, and limiting elements mounted on the stator device axially on both sides so that the stator device and the limiting elements bound an internal rotor space radially externally and axially on both sides in communication with axial ends of the first cooling channels of the stator device to thereby establish an internal air-cooling circuit from the internal rotor space through the first cooling channels and back into the internal rotor space.

According to another advantageous feature of the present invention, the liquid cooling medium ducting out of the housing can be used inside the motor vehicle for heating purposes, e.g. for heating up an electric energy store belonging to the motor vehicle and/or for heating a passenger compartment of the motor vehicle.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
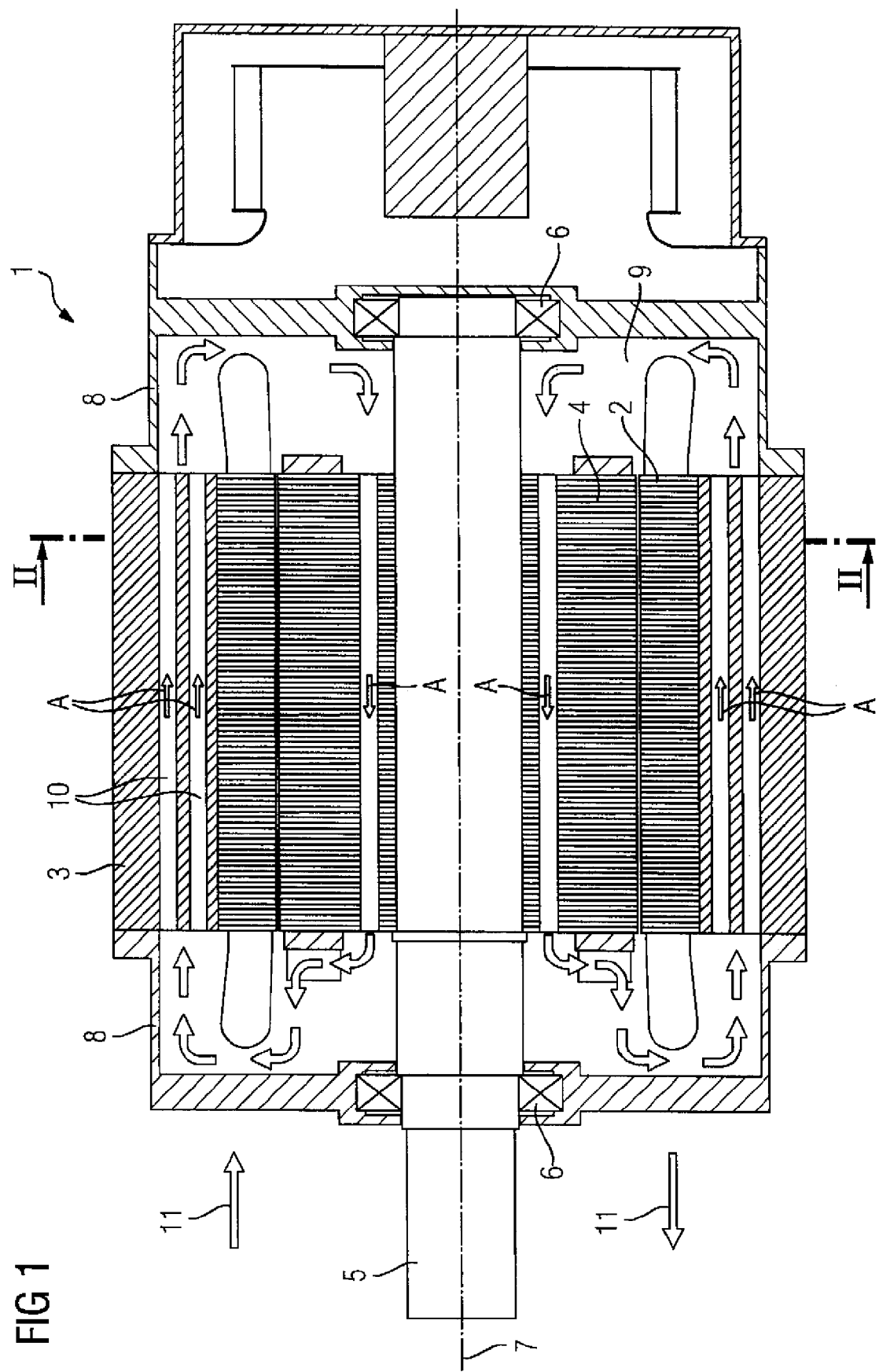
FIG. 1 is a longitudinal section of an electric machine according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a longitudinal section of an electric machine according to the present invention, having a stator device generally designated by reference numeral 1. The stator device 1 includes at least one stator 2 and a housing 3. The housing 3 surrounds the stator 2 radially externally so that stator 2 is held in a rotationally fixed manner in the housing 3. As an alternative, the stator device 1 may be constructed in the absence of a housing to form a non-enclosed electric machine.

The electric machine furthermore has a rotor 4 which is arranged in a rotationally fixed manner on a rotor shaft 5. The rotor shaft 5 is mounted in bearings 6 of the electric machine so that rotor shaft 5 including rotor 4 can be rotated around a rotational axis 7.

To ensure clarity, it is necessary to establish the definition of several important terms and expressions that will be used throughout this disclosure. The term "axial" is used in the following description to relate to the rotational axis 7 and refers to a direction parallel to rotational axis 7. The term "radial" also relates to the rotational axis 7 and refers to a direction orthogonal to the rotational axis 7 toward or away from the rotational axis 7. The term "tangential" also relates to the rotational axis 7 and refers to a direction orthogonal to the rotational axis 7 and also orthogonal to the radial direction. It thus signifies a direction at a constant radial distance and at constant axial location in circular relationship around the rotational axis 7.

Limiting elements 8 are mounted axially on both sides onto the stator device 1 onto the housing 3. The stator device 1 and the limiting elements 8 bound an internal rotor space 9 radially externally and axially on both sides in the case of a relatively high protection class, typically protection class IP 55 or better.

Axially extending in the housing 3 of the stator device 1 are first cooling channels 10 which are connected at their axial ends in a communicating manner to the internal rotor space 9. An internal air-cooling circuit is established by the first cooling channels 10. Air circulating in the internal air-cooling circuit is indicated in FIG. 1 by arrows A. The internal air-cooling circuit leads from the internal rotor space 9 radially outwardly to the axial ends on one side of the first cooling channels 10, then through the first cooling channels 10 to the other axial ends of the first cooling channels 10, and finally back radially inwardly to the internal rotor space 9. To effect forced convection, it is possible—though not mandatory—for a ventilator element to be arranged on the rotor shaft 5 inside the internal rotor space 9.

Figure 2:
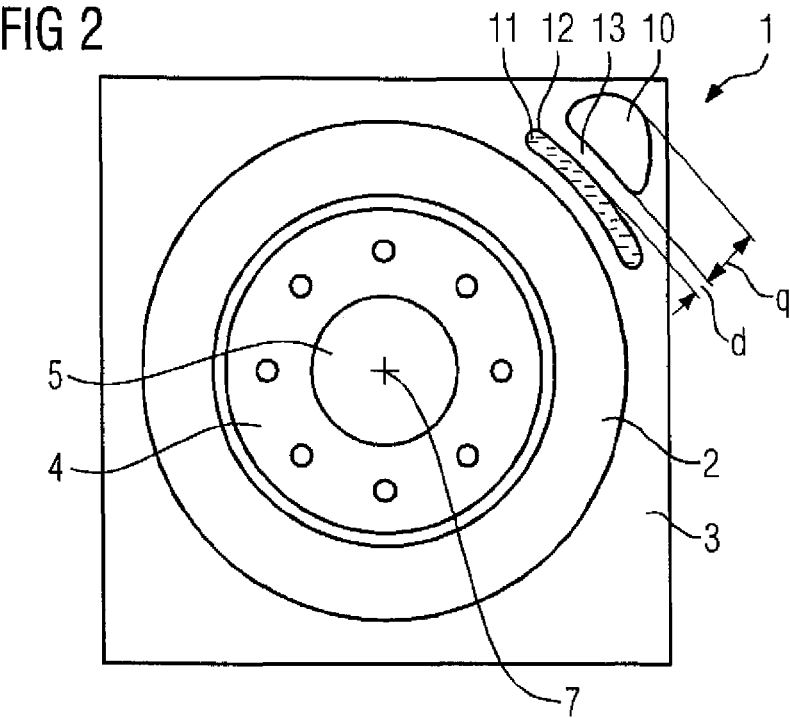
FIG. 2 is a cross-section of the electric machine shown in FIG. 1.

In the event, the stator device 1 has a substantially square cross-section, the first cooling channels 10 are suitably arranged in the region of the diagonals of the cross-section. That is shown for one of the corners in FIG. 2. The arrangement in the corners is however not necessarily required.

Figure 3:
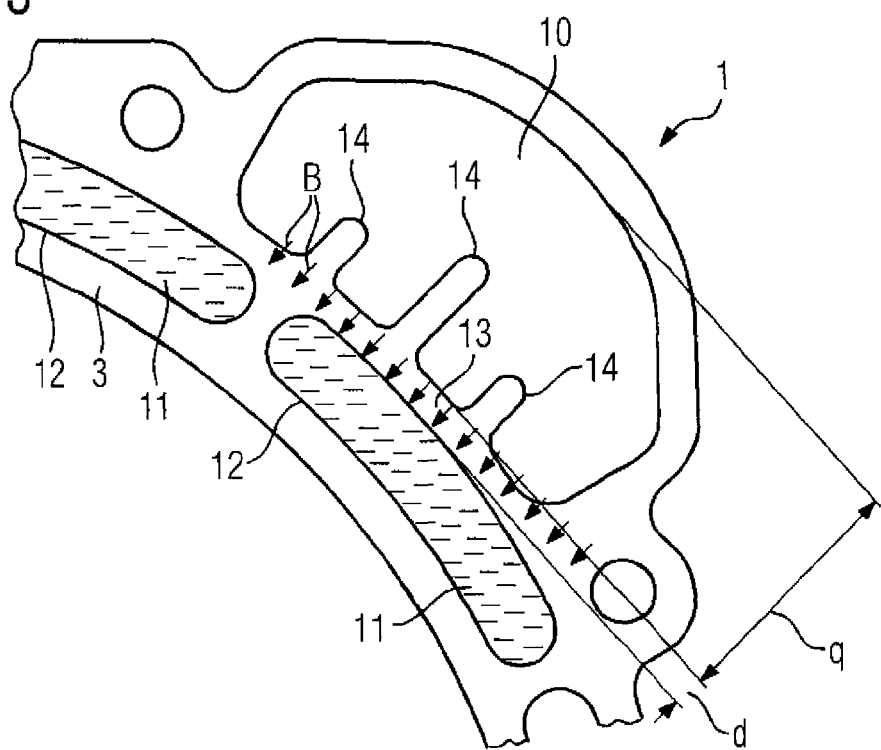
FIG. 3 is a detailed view of the cross-section through the electric machine shown in FIGS. 1 and 2.

A liquid cooling medium 11—for example water—is fed to the stator device 1, flows through the stator device 1, and is then ducted out of the stator device 1 again. Liquid cooling medium 11 is conducted at least partially through second cooling channels 12 which are arranged in the stator device 1. The second cooling channels 12 are suitably arranged—but not necessarily—in the housing 3 of the stator device 1, like the first cooling channels 10. Advantageously, the second cooling channels 12 are arranged in close proximity to the first cooling channels 10. The first cooling channels 10 and second cooling channels 12 are hereby separated from one another by partitions 13 of the stator device 1, as shown in FIG. 3. The partitions 13 are relatively thin-walled and have a wall thickness d of, preferably, at most 20% of a transverse extent q of the first cooling channels 10, with the direction of the transverse extent q extending orthogonally to the respective partition 13.

As shown in FIG. 3, the partitions 13 have cooling-fin-like primary projections 14 on their sides facing the first cooling channels 10. The cooling-fin-like primary projections 14 enlarge the contact surface for air of the internal cooling circuit. Enlarging the surface in that way facilitates a transfer of heat from air flowing through the first cooling channels 10 to the liquid cooling medium 11 which flows through the second cooling channels 12. Arrows B in FIG. 3 are intended to illustrate the flow of heat from the first cooling channels 10 to the second cooling channels 12.

Figure 4:
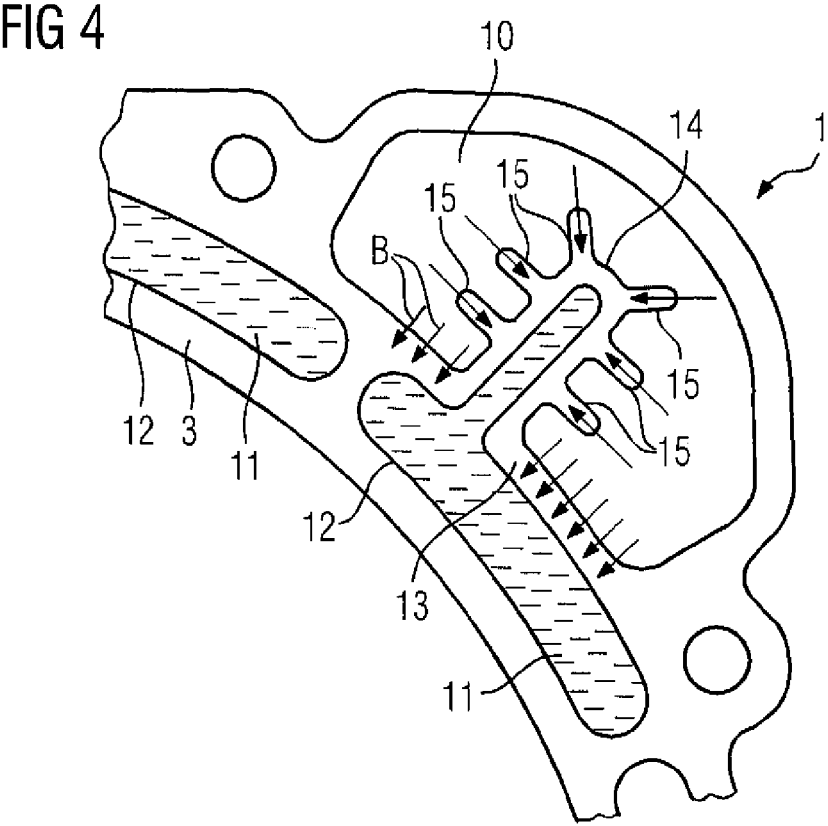
FIG. 4 is a detailed view, similar to FIG. 3, of a modification of an electric machine according to the present invention.

FIG. 4 is a detailed view, similar to FIG. 3, of a modification of an electric machine according to the present invention. Parts corresponding with those in FIG. 3 are denoted by identical reference numerals and not explained again. The description below will center on the differences between the embodiments. Arrows B are intended to illustrate a flow of heat from the first cooling channels 10 to the second cooling channels 12. In the embodiment of FIG. 4, the primary projections 14 have cooling-fin-like secondary projections 15 on their sides facing the first cooling channels 10. Transfer of heat from the first cooling channels 10 to the second cooling channels 12 is further optimized in this way. As further shown in FIG. 4, the cooling-fin-like primary projections 14 can be embodied as hollow inside so that liquid cooling medium 11 is able to flow through the respective hollow spaces. It will be appreciated by persons skilled in the art that the provision of the cooling-fin-like secondary projections 15 and the hollow configuration of the cooling-fin-like primary projections 14 are separate features that can be realized individually only or in combination, as shown by way of example in FIG. 4.

It is also possible for the parts of the primary projections 14 through which liquid cooling medium 11 flows to be constituent parts of the second cooling channels 12. They can alternatively be autonomous cooling channels.

As an alternative or in addition to the embodiments shown in FIGS. 3 and 4, it is possible to arrange in the first cooling channels 10 third cooling channels 16 that extend—at least substantially—along the entire axial length of the first cooling channels 10. This is shown by way of examples in FIGS. 5 and 6. Liquid cooling medium 11 is thus conducted not only through the second cooling channels 12 but also through the third cooling channels 16.

Figure 5:
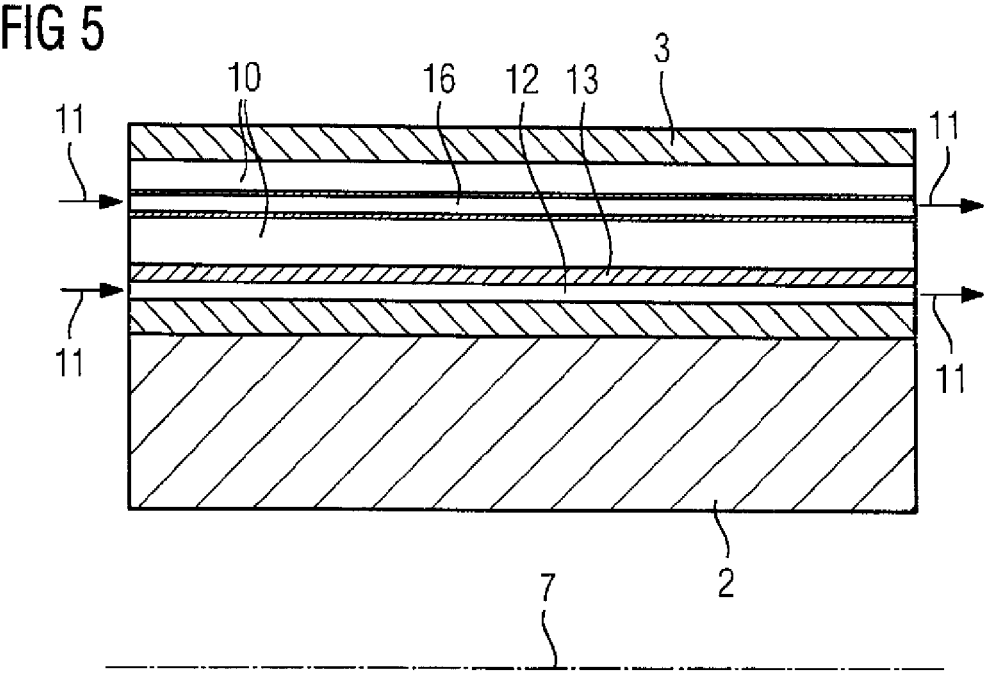
FIG. 5 is a cutaway sectional view of another embodiment of an electric machine according to the present invention.
Figure 6:
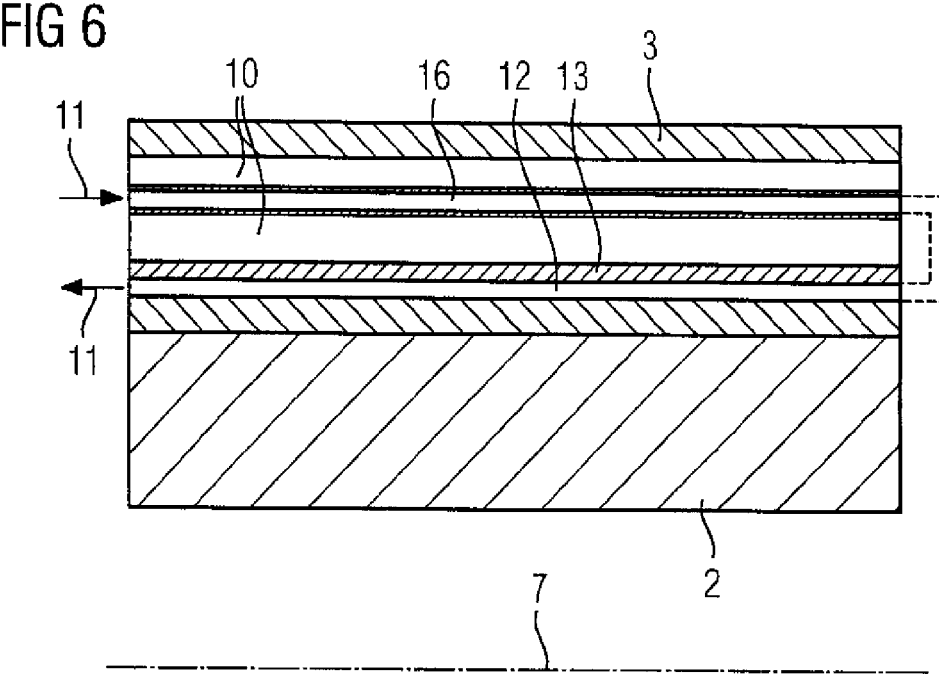
FIG. 6 is a cutaway sectional view of still another embodiment of an electric machine according to the present invention.

As shown in FIGS. 5 and 6, the second cooling channels 12 and the third cooling channels 16 are cooling channels that are different from one another in terms of the flow of liquid cooling medium 11. In FIG. 5, the second and third cooling channels 12, 16 are arranged parallel to one another whereas in FIG. 6, the second and third cooling channels 12, 16 are arranged in series with one another. This is indicated by the respective arrows. When arranged in series, liquid cooling medium 11 flows preferably first through the third cooling channels 16 and then through second cooling channels 12.

The third cooling channels 16 can be embodied particularly as pipes arranged in the first cooling channels 10. Embodiments of such kind are explained in more detail with reference to FIGS. 7 to 9.

Figure 7:
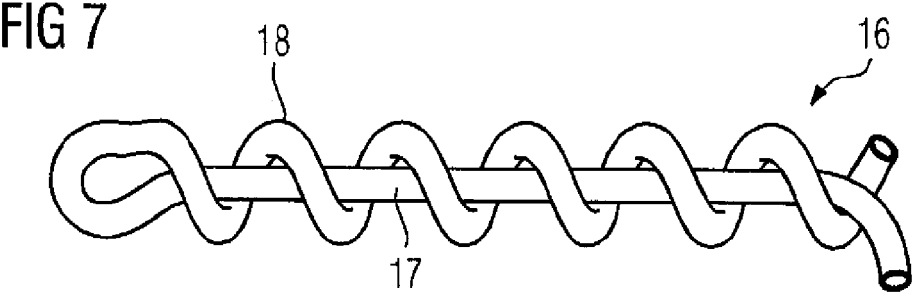
FIG. 7 is a schematic illustration of one variation of cooling channels formed by pipes.
Figure 8:
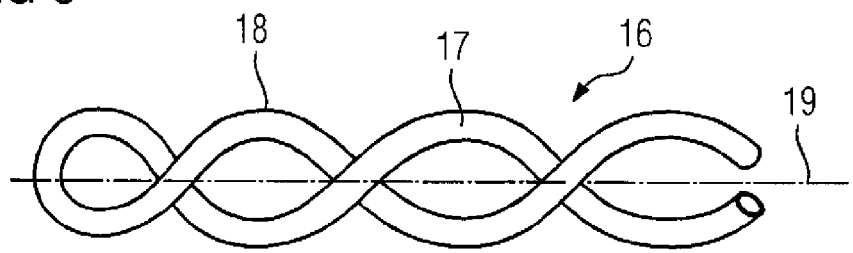
FIG. 8 is a schematic illustration of another variation of cooling channels formed by pipes.

According to FIGS. 7 and 8, pipes 16 can have, for example, first and second pipe sections 17, 18 which are arranged behind one another as viewed in the direction of flow of liquid cooling medium 11. According to FIG. 7, the first pipe section 17 extends axially, i.e. parallel to rotational axis 7, whereas the second pipe section 18 extends spirally around the first pipe section 17. As an alternative, as shown in FIG. 8, both pipe sections 17, 18—i.e. the first pipe section 17 as well as the second pipe section 18—run like a double helix around a channel axis 19 which extends parallel to the rotational axis 7.

Figure 9:
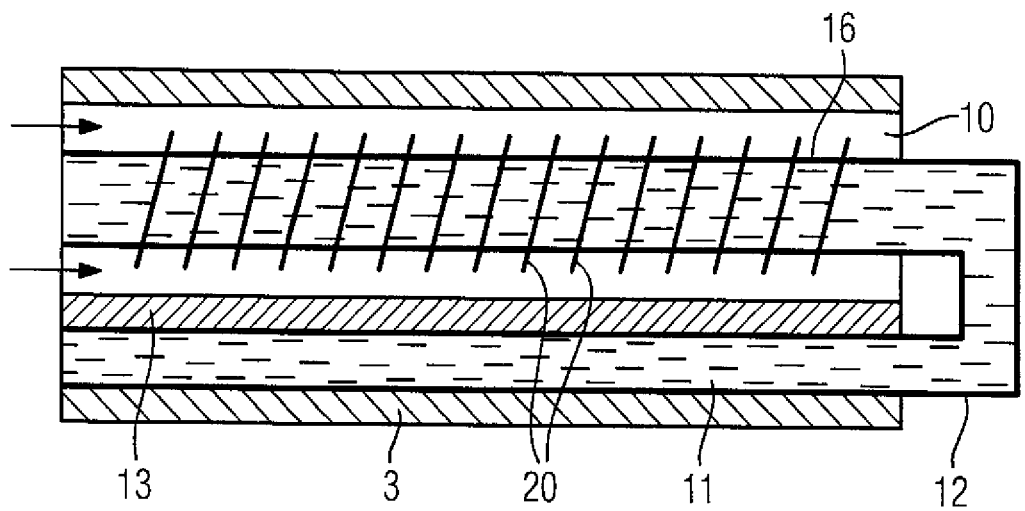
FIG. 9 is a cutaway sectional view of still another variation of cooling channels formed by pipes in an electric machine according to the present invention.

FIG. 9 shows another possible embodiment of pipes 16 that is an alternative to the embodiments shown in FIGS. 7 and 8. According to FIG. 9, the pipes 16 extend axially, i.e. parallel to the rotational axis 7. Arranged on the pipes 16 are air-ducting elements 20 which define a path, running helically around pipes 16, for the air in the internal air-cooling circuit. The air in the internal air-cooling circuit will thereby run spirally around pipes 16 arranged in the first cooling channels 10.

Figure 10:
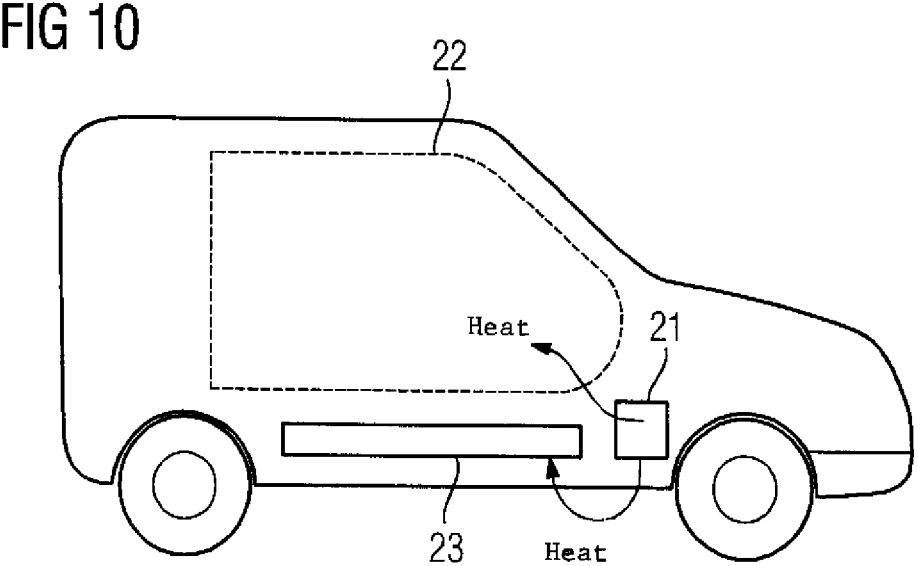
FIG. 10 is a schematic illustration of a motor vehicle having incorporated therein an electric machine according to the present invention.

An electric machine according to the present invention can basically be embodied in any way, for example as a synchronous or asynchronous machine or as a direct-current machine. Currently preferred is an embodiment as an electric asynchronous machine. An electric machine according to the present invention can also be incorporated as a main drive 21 of a motor vehicle, as shown by way of example in FIG. 10. In this case, the electric machine is advantageously embodied as an asynchronous machine.

When used as the main drive 21 of a motor vehicle, the stator device 1 has typically not only the stator 2 but also the housing 3. In that case (heated) liquid cooling medium 11 ducted out of the housing 3 can in particular be used inside the motor vehicle for heating purposes. For example, liquid cooling medium 11 can be used for heating a passenger compartment 22 of the motor vehicle. Liquid cooling medium 11 can alternatively or additionally be used for heating up an electric energy store 23 of the motor vehicle. Electric energy is hereby supplied to the electric machine from the electric energy store 13. Optionally, it is also possible—for example when decelerating the motor vehicle—to feed electric energy back into energy store 23.

The present invention has numerous advantages. The internal rotor space 9 of the electric machine can in particular be cooled efficiently. Heat recovery is furthermore possible to a considerable extent. Use in a motor vehicle—especially in winter—enables a heating of the energy store 23 and/or passenger compartment 22.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electric machine, comprising:
   a stator device having axial first cooling channels, and second and third cooling channels, said third cooling channels arranged in the first cooling channels and extending at least substantially along an entire axial length of the first cooling channels, said stator device being configured for inflow and outflow of a liquid cooling medium at least partially through the second cooling channels and for the liquid cooling medium to be conducted through the third cooling channels;
   a rotor shaft;
   a rotor arranged in a rotationally fixed manner on the rotor shaft;
   a bearing assembly supporting the rotor shaft so that the rotor shaft and the rotor are rotatable around a rotational axis; and
   limiting elements mounted on the stator device axially on both sides so that the stator device and the limiting elements bound an internal rotor space radially externally and axially on both sides in communication with axial ends of the first cooling channels of the stator device to thereby establish an internal air-cooling circuit from the internal rotor space through the first cooling channels and back into the internal rotor space.

2. The electric machine of claim 1, wherein the stator device has partitions to separate the first and second cooling channels from one another, said partitions having sides facing the first cooling channels and provided with cooling-fin-like primary projections.

3. The electric machine of claim 2, wherein the primary projections have sides facing the first cooling channels and provided with cooling-fin-like secondary projections.

4. The electric machine of claim 2, wherein the cooling-fin-like primary projections are hollow inside for flow of liquid cooling medium there through.

5. The electric machine of claim 4, wherein the primary projections are fluidly connected with the second cooling channels.

6. The electric machine of claim 1, wherein the second and third cooling channels for flow of liquid cooling medium are separate from one another.

7. The electric machine of claim 6, wherein the second and third cooling channels are arranged in terms of the flow of the liquid cooling medium parallel to one another.

8. The electric machine of claim 6, wherein the second and third cooling channels are arranged in terms of the flow of the liquid cooling medium in series with one another.

9. The electric machine of claim 1, wherein the third cooling channels are embodied as pipes arranged in the first cooling channels.

10. The electric machine of claim 9, wherein the pipes arranged in the first cooling channels have first and second pipe sections arranged behind one another as viewed in a direction of flow of the liquid cooling medium, said first pipe section extending axially, and said second pipe section extending spirally around the first pipe section.

11. The electric machine of claim 9, wherein the pipes arranged in the first cooling channels have first and second pipe sections arranged behind one another as viewed in a direction of flow of the liquid cooling medium, said first and second pipe sections extending in the form of a double helix around a channel axis in parallel relationship to the rotational axis.

12. The electric machine of claim 9, wherein the pipes arranged in the first cooling channels extend axially, and further comprising air-ducting elements arranged on the pipes so that air in the internal air-cooling circuit circulates spirally around the pipes.

13. The electric machine of claim 1, wherein the stator device has a stator and a housing which surrounds the stator radially externally.

14. A motor vehicle, comprising a main drive having an electric machine which includes a stator device having axial first cooling channels, and second and third cooling channels, said third cooling channels arranged in the first cooling channels and extending at least substantially along an entire axial length of the first cooling channels, said stator device being configured for inflow and outflow of a liquid cooling medium at least partially through the second cooling channels and for the liquid cooling medium to be conducted through the third cooling channels, a rotor shaft, a rotor arranged in a rotationally fixed manner on the rotor shaft, a bearing assembly supporting the rotor shaft so that the rotor shaft and the rotor are rotatable around a rotational axis, and limiting elements mounted on the stator device axially on both sides so that the stator device and the limiting elements bound an internal rotor space radially externally and axially on both sides in communication with axial ends of the first cooling channels of the stator device to thereby establish an internal air-cooling circuit from the internal rotor space through the first cooling channels and back into the internal rotor space.

15. The motor vehicle of claim 14, wherein the stator device has a stator and a housing which surrounds the stator radially externally, the liquid cooling medium ducting out of the housing and used inside the motor vehicle for heating purposes.

16. The motor vehicle of claim 15, further comprising an electric energy store heatable by liquid cooling medium ducted out of the housing.

17. The motor vehicle of claim 15, further comprising a passenger compartment heatable by liquid cooling medium ducted out of the housing.

* * * * *